No. 876,549. PATENTED JAN. 14, 1908.
J. A. HOFFMAN.
EGG BEATER.
APPLICATION FILED APR. 1, 1907.
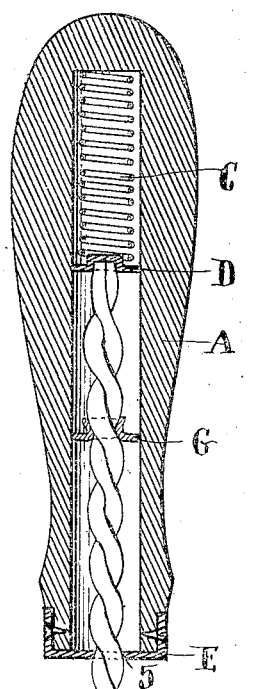
Fig 1
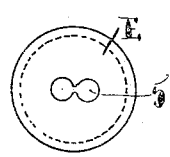
Fig 2
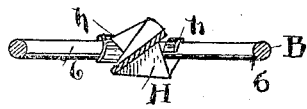
Fig 3.
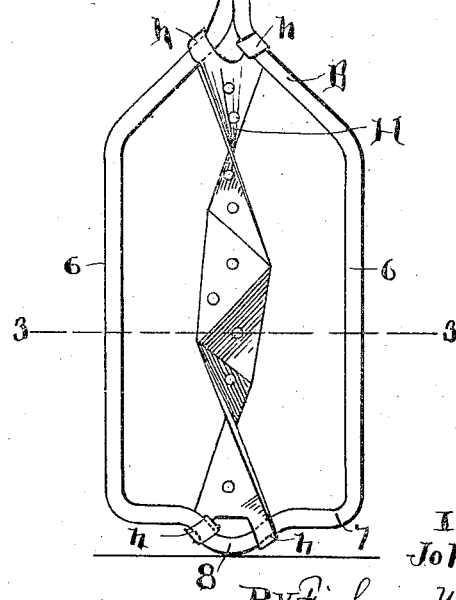
ATTEST
E. M. Fisher
J. C. Musser
INVENTOR
John A. Hoffman
By Fisher & Moser, ATTYS

UNITED STATES PATENT OFFICE.

JOHN A. HOFFMAN, OF CLEVELAND, OHIO, ASSIGNOR OF ONE-HALF TO WILLIAM G. BLACK, OF CLEVELAND, OHIO.

EGG-BEATER.

No. 876,549.   Specification of Letters Patent.   Patented Jan. 14, 1908.

Application filed April 1, 1907. Serial No. 365,684.

*To all whom it may concern:*

Be it known that I, JOHN A. HOFFMAN, a citizen of the United States, residing at Cleveland, in the county of Cuyahoga and State of Ohio, have invented certain new and useful Improvements in Egg-Beaters, and do declare that the following is a full, clear, and exact description of the invention, which will enable others skilled in the art to which it appertains to make and use the same.

My invention relates to egg beaters, and the invention consists in the construction of the beater, substantially as shown and described and particularly pointed out in the claims.

In the accompanying drawings, Figure 1 is an elevation of the beater with the handle in section lengthwise to disclose the internal construction and parts. Fig. 2 is a bottom view of the beater handle showing the cap thereon, and Fig. 3 is a cross section on line 3—3, Fig. 1.

As thus shown, the beater consists of the handle A, the beater B, and incidental or co-operating parts comprising a spring C, located in the top of the handle and adapted to bear endwise against the end of the shank of the beater.

In detail, handle A has an internal bore practically its full length open at its bottom, and provided with a cap over said end as hereinafter described. Beater B is formed preferably of a single piece of wire of suitable size and strength and has a stem or shank formed out of the two ends of the wire twisted or wound spirally around each other and having their end bearing or thrust in shield D at the bottom of the spring C, said shield or disk having a central socket into which the end of the combined shank extends and has its bearing. Said shank or stem comprising the two twisted wires 3 and 4 of the beater passes through a cap or plate E fixed rigidly upon the lower end of the handle and provided with a substantially 8 shaped aperture 5, each portion or wing whereof is adapted to receive one of the wires 3 and 4 and through the action of which working together the beater is rotated positively when the handle is pressed down by the operator. The reverse rotatation is effected by the spring lifting the handle while the grip thereof is maintained by the hand. In this operation each wire runs in its own portion of the said slot or opening 5 and remains therein permanently, so that when the handle is gripped by the operator and pressed down upon, the beater is caused to revolve, and the rate of revolution will depend upon the degree of pressure. This, of course, compresses spring C, so that when the pressure is released the said spring exerts its power on the handle and reverses the action of the beater. A guide washer G is clamped or soldered on the shank of the beater in the handle to form a guide and stop for the shank, thus centering the shank in its operations and preventing its withdrawal from the handle. The body or working portion of the beater comprises two spaced sides or wings 6, respectively, which are parallel to each other in their main portion and incline toward each other at their top where they run into the shank, and the bottom 7 of the beater is horizontal excepting that its center has a somewhat abrupt depression 8 to form a bearing or pivot point for the beater and forms the center of its rotations. This constitutes essentially the frame of the beater with whipping wings 6, and in order that there shall be effective central agitation also to keep the entire body of liquid in motion, I provide a spirally twisted plate H of suitable sheet metal, such as tin, which has a width relatively equal to about one-third of the space between the two sides 6 of the beater and has say three twists between its ends, thus throwing different relations thereof into different angular relations in respect to each other and making an effective center piece for the beater. The ends of said plate are constructed each with a pair of hook extensions *h* formed out of the plate itself and engaged over the wire of the beater and fasten the said plate firmly in working position.

This construction of beater produces a very simple device structurally, with no parts to get out of order and which is easily kept clean and is exceedingly effective in operation.

What I claim is:

1. An egg-beater having a beater frame and a twisted shank formed of a single piece of wire and having parallel beater sides and a horizontal bottom with central pivot point, in combination with a hollow handle having a double opening of the shape substantially of figure 8 in its bottom engaging said twisted stem, a spring in said handle bearing upon said stem, and a fixed spirally twisted mixing strip centrally of said beater.

2. An egg-beater having a beater frame formed of a single piece of wire with substantially parallel sides and a right angled bottom having a central depression forming a pivot point and inclined top portions terminating in a spirally wound shank, and a strip of twisted sheet metal fixed centrally in said beater frame from bottom to top, a tubular handle and a cap on the lower end thereof operatively engaging said shank to cause said beater to rotate in reverse directions alternately.

3. An egg-beater comprising a beater member formed of a single piece of wire and having parallel sides $b$—$b$ and a central bottom depression 8 and the ends thereof wound about each other and forming a shank, in combination with a hollow handle and a spring in the top thereof and a socketed plate beneath said spring forming a bearing for said shank, and a cap fixed on the bottom of said handle and having an opening in its center constructed to cause the shank and beater to rotate as downward pressure is applied to the handle.

In testimony whereof I sign this specification in the presence of two witnesses.

JOHN A. HOFFMAN.

Witnesses:
E. M. FISHER,
F. C. MUSSEM.